US012674924B2

(12) United States Patent
Sohr et al.

(10) Patent No.: US 12,674,924 B2
(45) Date of Patent: Jul. 7, 2026

(54) STRUCTURED PROTECTIVE WINDOWS FOR LIGHT ISOLATION

(71) Applicants: SCHOTT Corporation, Rye Brook, NY (US); SCHOTT AG, Mainz (DE)

(72) Inventors: Oliver Sohr, Mainz (DE); Sebastian Leugner, Gernsheim (DE); Kevin Tabor, Webster, MA (US); Elisabeth Han, Shrewsbury, MA (US); Hauke Esemann, Alzey (DE)

(73) Assignees: SCHOTT CORPORATION, Rye Brook, NY (US); SCHOTT AG, Mainz (DE)

( * ) Notice: Subject to any disclaimer, the term of this patent is extended or adjusted under 35 U.S.C. 154(b) by 303 days.

(21) Appl. No.: 18/549,363

(22) PCT Filed: Mar. 24, 2022

(86) PCT No.: PCT/EP2022/057728
§ 371 (c)(1),
(2) Date: Sep. 7, 2023

(87) PCT Pub. No.: WO2022/200483
PCT Pub. Date: Sep. 29, 2022

(65) Prior Publication Data
US 2024/0142683 A1 May 2, 2024

Related U.S. Application Data

(60) Provisional application No. 63/261,469, filed on Sep. 22, 2021, provisional application No. 63/186,185, filed on May 10, 2021, provisional application No. 63/166,265, filed on Mar. 26, 2021.

(51) Int. Cl.
G02B 5/22 (2006.01)

(52) U.S. Cl.
CPC .................................... G02B 5/22 (2013.01)

(58) Field of Classification Search
CPC ........ G02B 5/22; G02B 1/11; G02B 27/0018; G02B 5/003; G02B 5/00; G01S 7/4813; G01S 7/481; G06F 1/16
See application file for complete search history.

(56) References Cited

U.S. PATENT DOCUMENTS

| | | | |
|---|---|---|---|
| 10,702,211 B2 | 7/2020 | Clavelle et al. | |
| 11,086,052 B2 * | 8/2021 | Han | G02B 5/26 |
| 2017/0227686 A1 * | 8/2017 | Price | G02B 27/0172 |
| 2018/0228414 A1 * | 8/2018 | Shao | A61B 5/02427 |
| 2021/0068688 A1 | 3/2021 | Spencer et al. | |

FOREIGN PATENT DOCUMENTS

WO 2021033540 2/2021

\* cited by examiner

*Primary Examiner* — Balram T Parbadia

(57) ABSTRACT

The present disclosure relates to structured protective windows that have high transmission efficiency and can isolate light between different sections of the window. The structured protective windows are less prone to glass breakage compared to conventional protective windows that are typically used to protect and isolate light transmitting and light receiving components in LiDAR exterior automotive applications.

16 Claims, 8 Drawing Sheets

STRUCTURED PROTECTIVE WINDOWS FOR LIGHT ISOLATION

BACKGROUND OF THE DISCLOSURE

1. Field of the Disclosure

The present disclosure relates to structured protective windows that have high transmission efficiency and can isolate light between different sections of the window. The structured protective windows are less prone to glass breakage compared to conventional protective windows that are typically used to protect and isolate light transmitting and light receiving components in LiDAR exterior automotive applications.

2. Background of the Disclosure

Currently available protective windows for LiDAR transmitters and sensors are composed of two pieces of glass that are fused together at their sides using a polymer material. The polymer material optically separates the transmitters and sensors and prevents the transmitting light from contaminating the nearby sensors. These conventional protective windows suffer from the drawback that they can break at the fused polymer connection.

SUMMARY OF THE DISCLOSURE

The structured protective windows of the present disclosure can transmit light through the solid glass sections of the windows and physically protect the light transmitting and light receiving sections while eliminating or minimizing light contamination of the light detecting sensors by the light source.

In some embodiments, a structured protective window comprises a base material having a thickness, a light transmitting section, a light receiving section and a plurality of optical isolation channels. The plurality of optical isolation channels can be openings located in the thickness of the base material, and each optical isolation channel can have a vertical side wall that is substantially parallel to the thickness of the base material. Adjacent optical isolation channels can have a certain horizontal overlap and a certain vertical overlap. The structured protective window can transmit light while the optical isolation channels can attenuate scattered light from internally transmitting within the base material from the light transmitting section to the light receiving section. An optical isolation material can be applied to at least one vertical side wall of the plurality of optical isolation channels to enhance the optical attenuation.

DETAILED DESCRIPTION OF THE DISCLOSURE

Figure 1:
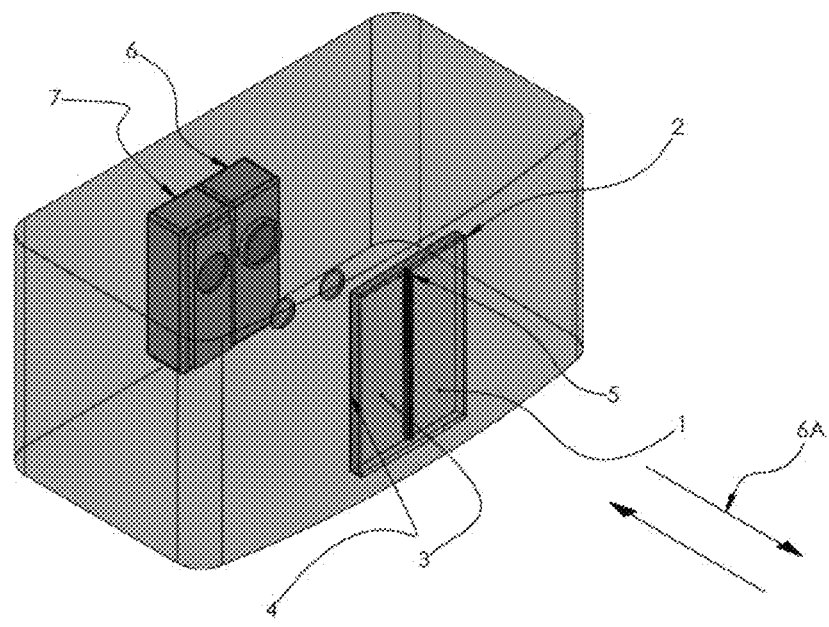
FIG. 1 shows an optical system having a structured protective window according to an embodiment of the invention.

FIG. 1 shows an embodiment where the structured protective window 1 is a plate-like base material having a thickness 2, a light transmitting section 3, a light receiving section 4 that is generally opposite the light transmitting section 3, and a plurality of curved optical isolation channels 5 located between the light transmitting section 3 and the light receiving section 4. FIG. 1 also shows light source 6 behind light transmitting section 3 and light detecting sensors 7 behind light receiving section 4 as well as the outgoing and incoming direction of light beam 6A that is transmitted and reflected.

The plurality of optical isolation channels 5 can attenuate scattered light from internally transmitting within the base material from the light transmitting section 3 to the light receiving section 4. The scattered light could be light that is misdirected as the incoming light beam passes through the structured protective window. Such structured protective windows may be helpful in applications where it is desirable for example to isolate and prevent contamination of light detecting sensors from the light that is emitted from an adjacent light source.

The light transmitting section transmits an outgoing light beam toward a target and the light receiving section transmits the incoming reflected light beam toward the light detecting sensors. As the light beam enters then exits the light transmitting section, the plurality of optical isolation channels attenuate the scattered light from internally transmitting within the base material from the light transmitting section to the light receiving section. This attenuation protects the sensitive light detecting sensors from light contamination. In some embodiments, the attenuation of scattered light (when the structured protective window does not include an optical isolation material) is from about 1 to about 20 dB or from about 3 to about 10 dB. In some embodiments (when the structured protective window does include an optical isolation material described herein), the attenuation of scattered light can be from about 10 to about 150 dB, from about 10 to about 90 dB, or from about 30 to about 65 dB. Protective windows such as these can be used in LiDAR exterior automotive applications and in other applications where it is desirable to prevent a light source from contaminating adjacent light detecting sensors.

The structured protective window may have any shape that is desired for the intended application. FIG. 1 shows a structured protective window 1 in the form of a square plate-like material, for example a flat glass sheet, but any other shape is possible. The optical isolation channels can extend into the base material from the surface of the base material on the side opposite to the light source and sensors or the optical isolation channels can additionally, or alternatively extend into the base material from the surface of the base material on the same side as the light source and sensors, or can extend through the entire thickness of the base material. In some embodiments, two structured protective windows may be adhered together to form a combined structured protective window unit. In such embodiments, the location of the optical isolation channels of each individual structured protective window may face toward or away from the light source and sensors. In some embodiments, the optical isolation channels of the innermost structured protective window extend into the base material from the surface opposite to the light source and the sensors, while the optical isolation channels of the outermost structured protective window extend into the base material from the surface nearest to the light source and the sensors, which results in a combined structured protective window unit having a series of optical isolation channels within the interior of the combined structured protective window unit while the outermost surfaces of the combined structured protective window are substantially smooth without any surface structuring. In other embodiments, three or more structured protective window are adhered together with optical isolation channels extending in any of the directions described herein.

The base material can be made from any material that has high transmission (for example greater than 90%) in the wavelengths of interest for the light detecting sensor performance, for example they can be made from a plate-like material composed of a single glass material or a single polymer material. The typical transmission wavelength range of interest for light detecting sensors is approximately 350-2,500 nm, ideally suited for transmitting typical 905 nm, 1,310 nm and 1,550 nm laser emission wavelengths. Optical glass having a bulk transmission of about 97 to about 99% in the visible and near infrared spectrums is a suitable example. The base material can have any thickness suitable for the intended application. In some embodiments, the thickness can be from about 100 μm to about 10 mm or from about 1 to about 3 mm.

Figure 2:
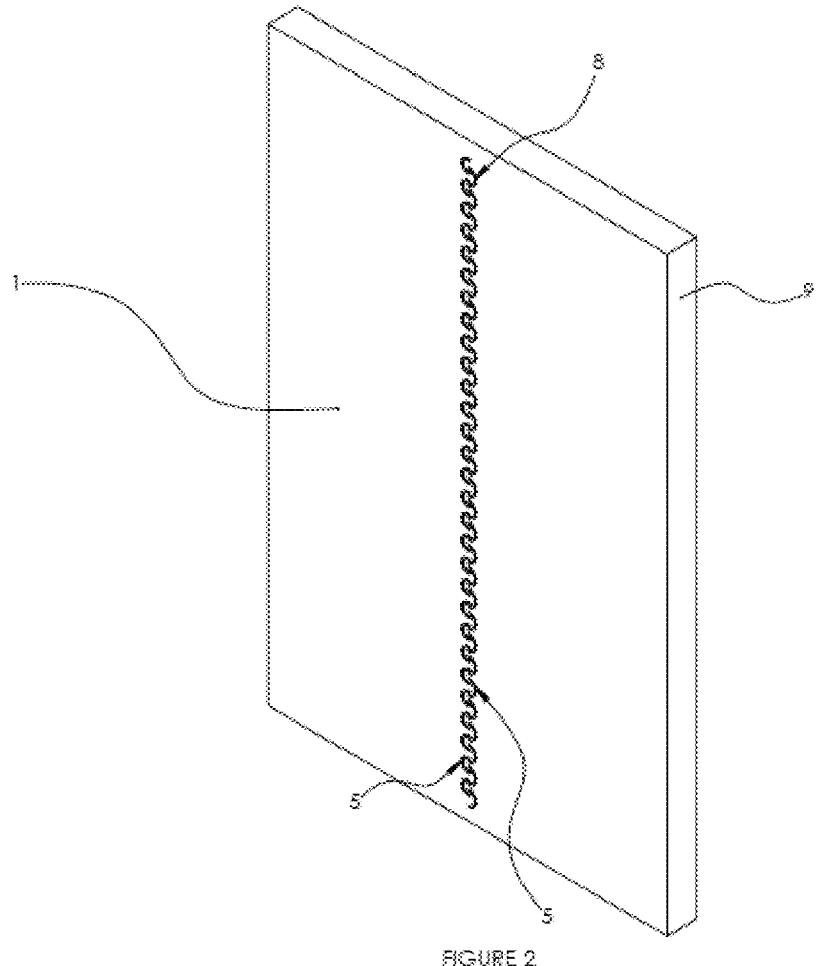
FIG. 2 shows a plurality of curved optical isolation channel according to an embodiment of the invention.

The optical isolation channels can be open segments within the thickness of the base material that remain after portions of the starting material for the base material are removed by for example lasering and etching. Each of the optical isolation channels 5 can have a vertical side wall 8 that is substantially parallel to the side face 9 of the structured protective window 1 for example as shown in FIG. 2. The optical isolation channels may have a shape that ranges from curved to straight.

Figure 3:
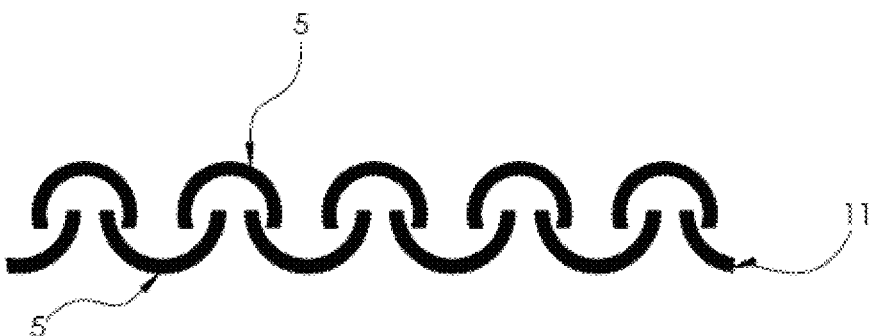
FIG. 3 shows a plurality of curved optical isolation channels according to an embodiment of the invention.

The plurality of optical isolation channels 5 can be a consecutive, non-linear and/or non-uniform series of individual and adjacent curved optical isolation channels 5, as shown for example in FIG. 3. It is not necessary for each of the individual curved optical isolation channels to have the same curvature, depth or other dimensions compared to an adjacent individual curved optical isolation channel. A randomized dimensional distribution of individual curved optical isolation channels may improve the mechanical stability and the breakage resistance of the structured protective window, as opposed to a series of identical optical isolation channels that each have the exact same dimensions, by creating a diverted path that the crack fault line would have to travel to reach the other side of a curved optical isolation channels. However, at least for ease of manufacture, it may be efficient for the lasering and etching process to produce one row of optical isolation channels each having the same dimensions that faces another row of optical isolation channels each having their own same dimensions, for example as shown in FIG. 3, where the radius of the channels in the top row is smaller than the radius of the channels in the bottom row or vice-versa. This would facilitate a formation process where the base material can be processed in essentially a straight line across the material using the same lasering and etching parameters to produce the first row of optical isolation channels, then the material can be processed in essentially a second straight line to produce the second row of optical isolation channels.

Figure 3B:
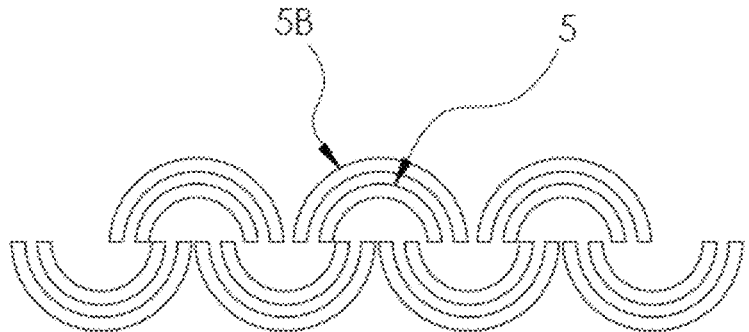
FIG. 3B shows two rows of curved optical isolation channels according to an embodiment of the invention.

As shown in FIG. 3B, one or more of the individual curved optical isolation channels 5 can be at least partially surrounded by additional curved optical isolation channels 5B. All of these additional optical isolation channels can be formed in the same manner as the other optical isolation channels described herein and can have the dimensions as the other optical isolation channels described herein, and in combination with the optical isolation channels being surrounded, the combined first row and second row structure may visually appear similar to the lamella of an onion. This combined concentric structure may provide a larger surface area for the application of functional coatings and may also enhance the optical and mechanical properties described herein. The first and second rows of optical isolation channels shown in FIG. 3B can similarly be at least partially surrounded by additional rows of optical isolation channels. The distance between each of the rows in some embodiments is 25 μm to 1,000 μm.

In addition to the optical attenuation provided by each of the optical isolation channels with an optical isolation material, or without an optical isolation material in part due to the refractive index difference between the solid base material and the open interior of an optical isolation channel, the optical isolation channels can also contribute to the mechanical stability of the protective window by helping to mitigate crack propagation. For example, the shape and proximity of each of the optical isolation channels can help block a crack initiating in a particular location from propagating to a neighboring location. The curvature of the channels when they are curved may also create compressive and tensile stresses that could influence crack propagation. In contrast, if the curved optical isolation channels were a series of straight channels without any curvature, light might pass through and they would form a fault line along which the protective window may crack more easily.

Figure 4:
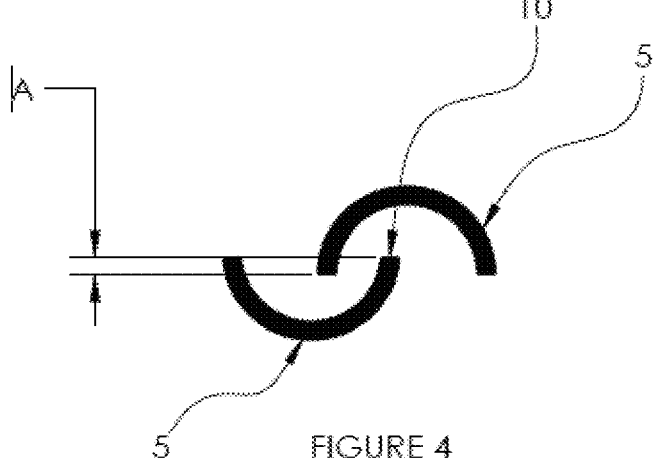
FIG. 4 shows a vertical overlap according to an embodiment of the invention.

To contribute to the mechanical stability and the attenuation of scattered optical signals between two opposite sides of the plurality of optical isolation channels, each curved optical isolation channel should have a certain degree of overlap with its adjacent optical isolation channel. This overlap can form a consecutive series of intertwining curved optical isolation channels, for example as shown in FIG. 3 and FIG. 4 where the ending point 10 of one curved optical isolation channel 5 bisects an imaginary line drawn between the starting and ending points of the adjacent curved optical isolation channel 5, where the ending point 10 is pointed toward the concave interior side of the adjacent curved optical isolation channel 5. When light contacts a curved optical isolation channel, it can be reflected or absorbed without any space for the light to transmit between adjacent channels from one side of the channels to the other side. A series of the optical isolation channels can thereby attenuate scattered light from an outgoing light beam from internally transmitting within the base material from the light transmitting section to the light receiving section and to the light detecting sensors.

This relationship between adjacent curved optical isolation channels is referred to herein as the vertical overlap and the horizontal overlap. The vertical overlap is the distance between the end point and the starting point of adjacent curved optical isolation channels ("Distance A" in FIG. 4). The vertical overlap in some embodiments is from a minimum of 10 μm to a maximum of the radius of the smaller curved optical isolation channel (if one is smaller, otherwise the radius of either) minus the channel width. This can be expressed as 10 μm≤vertical overlap≤smaller radius–channel width ("Formula A"). In some embodiments, the vertical overlap is from about 50 to about 500 μm, from about 100 to about 400 μm, or from about 200 to about 300 μm. The vertical overlap can be achieved by adjusting the curvature and other dimensions of the curved optical isolation channels during the structuring process that forms the curved optical isolation channels.

Figure 5:
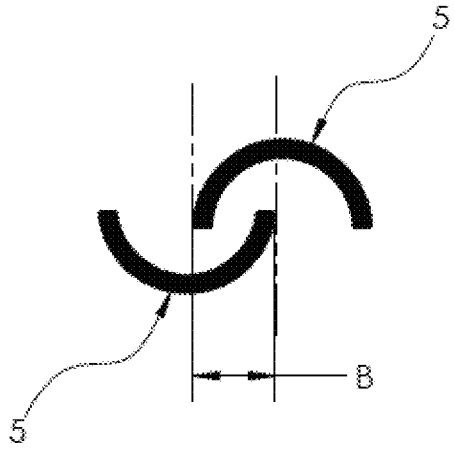
FIG. 5 shows a horizontal overlap according to an embodiment of the invention

The horizontal overlap is the distance between the outermost perimeters of adjacent curved optical isolation channels ("Distance B in FIG. 5"). The horizontal overlap in some embodiments is from a minimum of 30 μm plus twice the channel width to a maximum of the radius of the smaller curved optical isolation channel (if one is smaller, otherwise the radius of either) minus twice the channel width. This can be expressed as 30 μm+(2×channel width)≤horizontal overlap≤smaller radius–(2×channel width) ("Formula B"). In some embodiments, the horizontal overlap is from about 50 to about 500 μm, from about 100 to about 400 μm, or from about 200 to about 300 μm. The horizontal overlap can be achieved by adjusting the curvature and other dimensions of the curved segments during the structuring process that forms the curved optical isolation channels.

The vertical overlap and the horizontal overlap play a significant role in the mechanical and optical properties of the structured protective window.

The dimensions of the curved optical isolation channels depends on the intended application. In some embodiments, the radius of each of the curved optical isolation channels is from about 25 μm to about 10 mm, from about 50 μm to about 3 mm, from about 200 μm to about 3 mm, or from about 500 μm to about 3 mm. In some embodiments, the radii of adjacent curved optical isolation channels is different, for example one radius is greater than the other, for example as shown in FIG. 3. Each of the curved optical isolation channels may be nonparallel to each other. Such a distribution of different dimensions and locations can help improve mechanical stability as described above.

Figure 7:
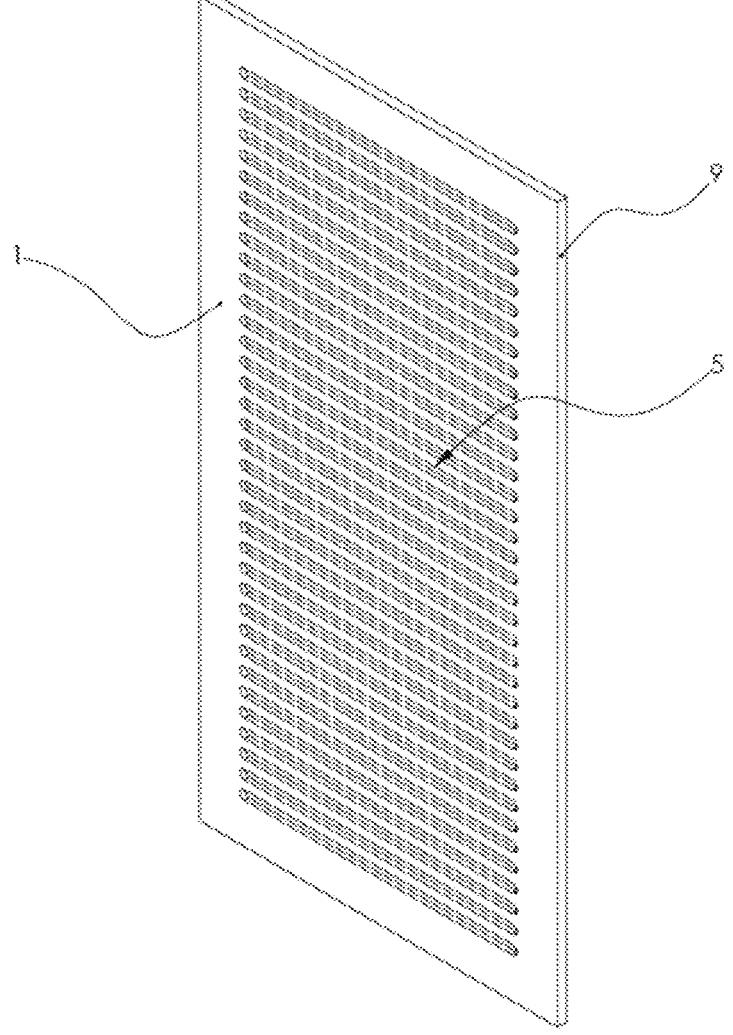
FIG. 7 shows a series of straight optical isolation channels.

In some embodiments it may be suitable for the optical isolation channels instead of being curved to be a series of straight channels as shown in FIG. 7. FIG. 7 also shows that the channels of two adjacent sets of optical isolation channels may be offset from each other. Like the curved optical isolation channels, these optical isolation channels can also attenuate scattered light from internally transmitting within the base material from the light transmitting section to the light receiving section.

The sets of adjacent straight, parallel and offset optical isolation channels may or may not have the same dimensions and other properties as the curved optical isolation channels described herein, other than being straight instead of curved. In some embodiments, the distance between adjacent parallel optical isolation channels may be the same or different and may be from about 25 μm to about 1,000 μm.

Since the curved optical isolation channels are relatively close to one another because of the vertical and horizontal overlap, they may be located between the light transmitting section and the light receiving section of a device. However, this may not be possible for adjacent straight, parallel and offset optical isolation channels because the distance between the each adjacent channel may be larger than the distance between the light transmitting section and the light receiving section of a device. In such a case one of the two adjacent optical isolation channels can be between a first light transmitting section and its adjacent light receiving section and the second of the two optical isolation channels can be between that adjacent light receiving section and a second light transmitting section. In other words the adjacent sequence can be one or more light transmitting sections, one or more straight, parallel and offset optical isolation channels, one or more light receiving sections, then one or more straight, parallel and offset optical isolation channels.

The depth of the side walls 8 of the optical isolation channels into the thickness of the base material in some embodiments can range from about 50 μm to about 10 mm or from about 200 μm to about 2 mm. In some embodiments, the width 11 of the optical isolation channels can range from about 10 μm to about 1 mm or from about 20 μm to about 200 μm.

Suitable processes to form the optical isolation channels include laser filamentation followed by etching. In such processes, a laser is applied to a precursor base material that does not have any optical isolation channels, for an example a flat glass sheet. The lasering and subsequent chemical etching process remove select portions of the glass precursor material in a precise manner to create the plurality of optical isolation channels. The plurality of optical isolation channels are essentially empty spaces that are created by removing portions of the precursor material.

Each of the optical isolation channels can be formed by producing a series of consecutive filaments that are etched together to connect each filament to form each individual optical isolation channel.

It is not necessary for the optical isolation channels to extend completely through the entire thickness of the structured protective window, although it may be desirable in some embodiments for the optical isolation channels to extend completely through the thickness. In some embodiments, the optical isolation channels extend from either the light inlet side or the light outlet side of the base material through about 5% to about 100% of the thickness of the structured protective window, from about 50% to about 100%, from about 5% to about 95%, or from about 50% to about 95%.

The total number of individual optical isolation channels that is created is not particularly limited. In addition, the structured protective window may have one or more pluralities of optical isolation channels, for example a first plurality in one location of the window and a second portion in another location.

The structured protective windows are not required to have parallel faces. The faces can be curved which can be particularly useful to accommodate light detecting sensors on three dimensional surfaces.

The operation of the laser and suitable laser specifications are known to those in the art and are not particularly limited. Suitable wavelengths are 400-1,600 nm, preferably 1064/532 nm (Nd:YAG) or 1030/515 nm (Er:YAG). Pulse durations can be ultra short pulse (UKP) at 1 ns>t>50 fs with 1-8 bursts. The repetition rate can be 10 kHz to 2 MHz. The power can be 5 to 200 W on average. The energy can be 50 μJ to 40 mJ. The raw beam can be Gaussian, flat top, donut or airy. The machinery can be an XYZ motiondrive with <5 μm precision/repeatability with a dual (or multiple) beam path (1 fixed optics+1 scanner) at an XY Axis speed of 100 to 2,000 mm/s and a scanner speed of 500 to 5,000 mm/s.

Suitable etching processes are known to those in the art and are not particularly limited. For example, liquid etching can be used with or without a lye, acid and other additives. Dry etching with plasma and steam assist can also be used.

The optical isolation channels can have an optical isolation material applied to a surface thereof, for example to at least one side wall and/or at least one channel bottom, to aid in the attenuation of scattered light between the light transmitting section and the light receiving section. The optical isolation material can be for example an opaque material, an absorptive material, and/or a reflective material. An optical material can also be applied. The materials can also act as a mechanical stabilizer for the structured protective window by providing twisting and bending reduction. Other suitable materials include anti reflective (AR) and band pass (BP) coatings. The materials can be applied via known techniques. The optical isolation materials can be applied in one or more layer combinations and/or as a filler for the optical isolation channels.

In some embodiments, it is desirable for the optical isolation material to have a high absorbance in the wavelength region that is sensed by the target light detecting sensor so that the relevant wavelengths of light do not contaminate an adjacent light detecting sensor. A suitable optical isolation material can be an absorptive material such as a glass frit, preferably a black glass frit, graphite, carbon black, a metal, and/or other absorbing materials, including those with an extinction coefficient (k value) above 0.01 in the relevant wavelength, such as SiC, TiN, and silicon oxycarbide. The material can contain an absorbing pigment such as a black spinel such as a manganese ferrite spinel, carbon black and/or graphite. Suitable binders for the absorbing pigments include a silicone, an organic binder (eg an epoxy, a polyurethane or an acrylic resin), and/or an inorganic organic hybrid binder (eg an ormocer).

Figure 6:
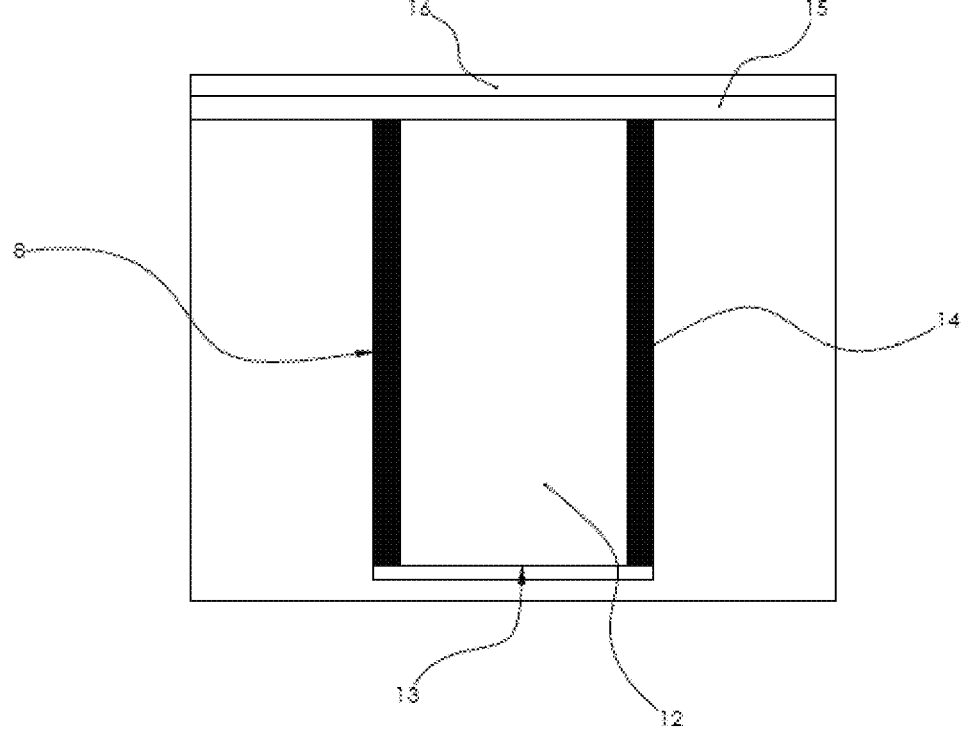
FIG. 6 shows a curved optical isolation channel having multiple optical isolation materials applied thereto.

In addition to or as an alternative to an absorbing material, a reflective material can be applied to the optical isolation channels. FIG. 6 shows an embodiment with a reflective coating 12 applied to vertical side wall 8 of the optical isolation channels 5 and to the channel bottom 13, an absorbing coating 14 applied to the reflective coating 12 and filling the majority of the optical isolation channel 5, a band pass filter coating 15 applied to the surface of the base material, and an anti-reflective coating 16 applied to the band pass filter coating 15. In other embodiments, one of more of these optical isolation materials may be applied to one or more different surfaces. Some of these materials can fill the optical isolation channels which enhances stability and enables the facile polishing of the surface of the base material to be perfectly or nearly perfectly planar without breakage and while retaining the mechanical strength of the entire structured protective window. All of the described materials can be applied by known techniques, including liquid coating, gas phase deposition, and physical deposition techniques such as CVD, PE CVD, ALD and PE ALD.

Suitable absorbing materials also include high k materials that absorb light of the relevant wavelength and simultaneously support stability of the entire structured protective window (for example low melting metals and solder pastes; binder systems that support stability of the structured protective window with pigments that absorb light of the relevant wavelength; and binder systems that fill the optical isolation channels and contain organic groups that can be carbonized after filling by rapid laser heating or tempering in inert atmosphere). Suitable binder systems include organic polymers (such as epoxy, polyurethanes and acrylics), silicone based polymers (such as silsesquioxanes and less crosslinked silicones), inorganic organic hybrid materials (such as ormocers) and glass frits.

Suitable reflective materials include materials that have high reflectivity in the relevant wavelength (for example metallic silver, aluminum, indium doped tin oxide and aluminum doped zinc oxide) and alternating low and high refractive index material layers with specific layer thickness that build a Bragg reflector for the specific wavelength to reflect (for example alternating layers of $SiO_2$ $TiO_2$ $SiO_2$).

The structured protective windows are useful for example as cross-talk inhibitors in man operated or autonomous vehicle collision avoidance in automobiles, trucks, and aerial vehicles such as drones, and anywhere collision avoidance is necessary. They are also useful in (multi-) spectral cameras for the selective analysis of multi-wavelength optical signals, for example, smartphones, as well as being useful in high-resolution medical applications as well as space and automotive applications. The structured protective windows are useful in LiDAR systems and as x-ray imaging faceplates and x-ray collimations arrays and biometric sensors. The structured protective windows may be a component of an optical system that comprises the structured protective window, a light source and a light sensor.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A structured protective window, comprising:
a base material having a thickness, a light transmitting section and a light receiving section; and
a plurality of curved optical isolation channels located in the thickness of the base material, each optical isolation channel having a width, a radius, and having a vertical side wall that is substantially parallel to the thickness, wherein adjacent optical isolation channels have a vertical overlap of Formula A and a horizontal overlap of Formula B,
wherein the optical isolation channels attenuate scattered light from internally transmitting within the base material from the light transmitting section to the light receiving section, $$10 \ \mu m \leq \text{vertical overlap} \leq \text{radius of smaller optical isolation channel} - \text{width of optical isolation channels}, \quad \text{Formula A:}$$

$$30 \ \mu m + (2 \times \text{width of optical isolation channels}) \leq \text{horizontal overlap} \leq \text{radius of smaller optical isolation channel} - 2 \times \text{width of optical isolation channels}). \quad \text{Formula B:}$$

2. The structured protective window of claim 1, wherein the vertical overlap is from about 50 to about 500 μm.

3. The structured protective window of claim 1, wherein the horizontal overlap is from about 50 to about 500 μm.

4. The structured protective window of claim 1, wherein radii of adjacent curved optical isolation channels is different.

5. The structured protective window of claim 1, wherein an optical isolation material is applied to at least one vertical side wall and/or at least one channel bottom of the plurality of optical isolation channels.

6. The structured protective window of claim 5, wherein the optical isolation material comprises an opaque material, an absorptive material, and/or a reflective material.

7. The structured protective window of claim 5, wherein the optical isolation material comprises a light absorbing material applied on a light reflective material.

8. The structured protective window of claim 5, wherein the optical isolation material is also applied to an optical isolation channel bottom.

9. The structured protective window of claim 1, wherein the base material is comprised of single glass material or a single polymer material.

10. The structured protective window of claim 1, wherein the attenuation is from about 1 to about 20 dB.

11. The structured protective window of claim 1, wherein the attenuation is from about 10 to about 150 dB.

12. The structured protective window of claim 1, wherein the optical isolation channels extend through about 5% to about 100% of the thickness of the base material.

13. The structured protective window of claim 1, wherein the width of the optical isolation channels is about 10 μm to about 1 mm and a depth of the optical isolation channels is about 50 μm to about 10 mm.

14. The structured protective window of claim 1, wherein the plurality of curved optical isolation channels comprise a first row of optical isolation channels each having same dimensions facing another row of optical isolation channels each having their own same dimensions.

15. The structured protective window of claim 14, wherein the first row is at least partially surrounded by a second row of optical isolation channels.

16. An optical system comprising the structured protective window of claim 1, a light source and a light sensor.

* * * * *